Sept. 29, 1959     C. P. WEAVER     2,906,084
SIDE DELIVERY RAKE
Filed June 2, 1955                                                    2 Sheets-Sheet 1
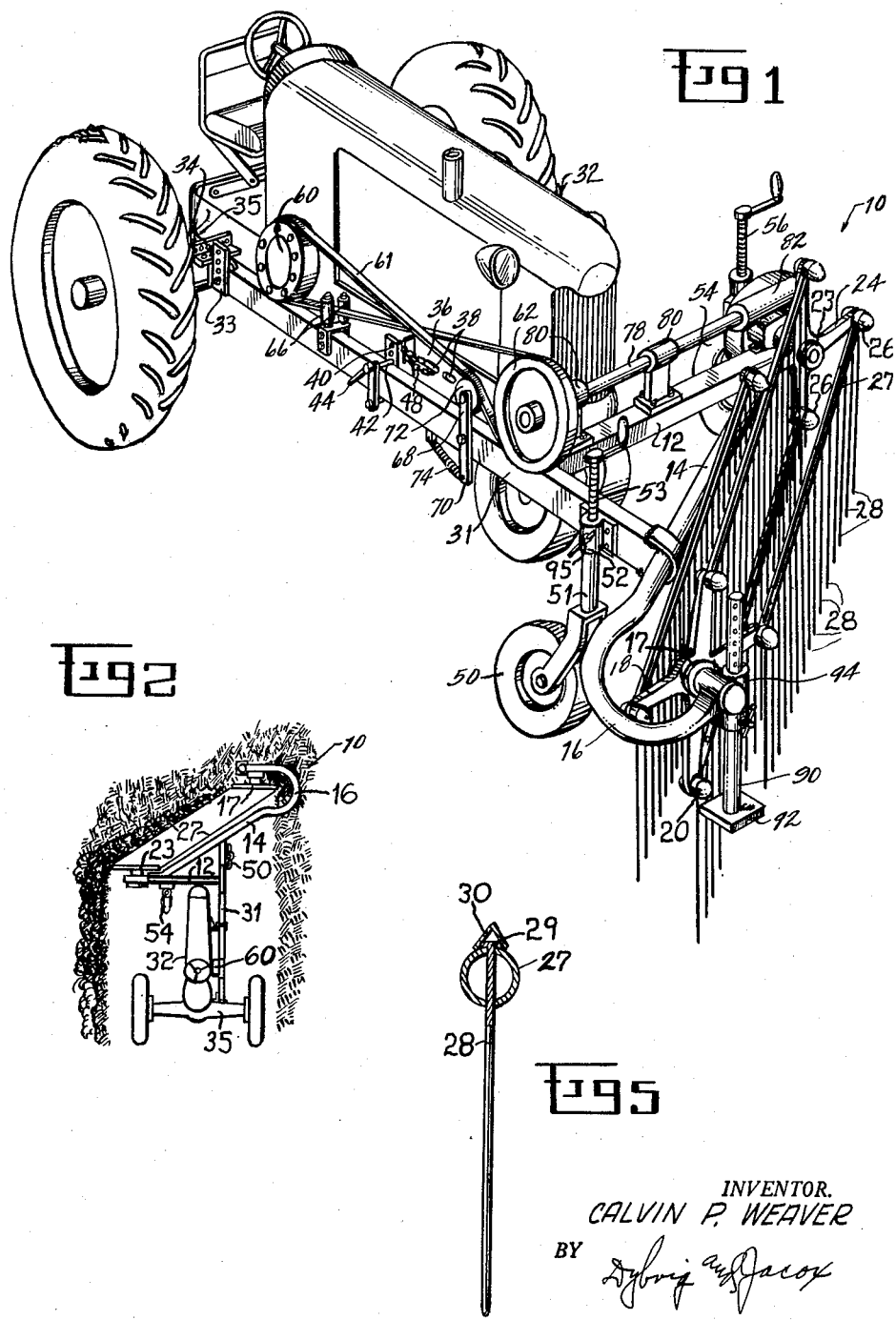
INVENTOR.
CALVIN P. WEAVER
BY
*His Attorneys*

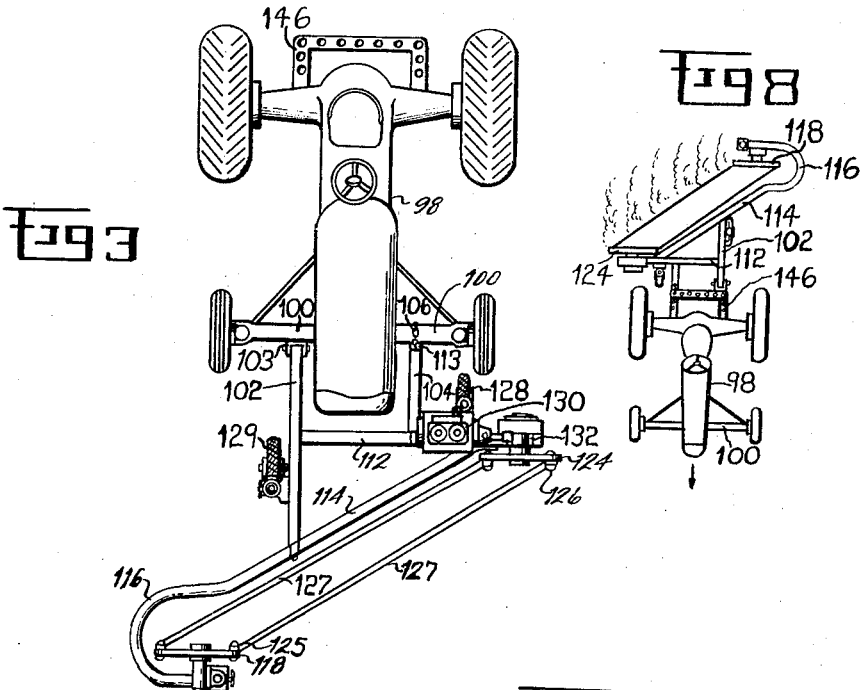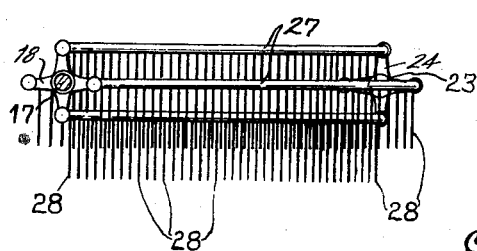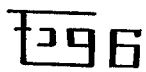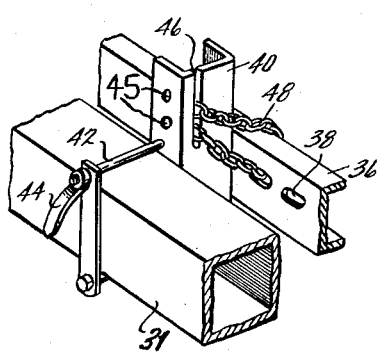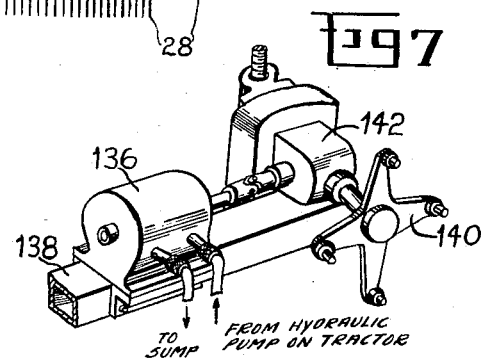

United States Patent Office 2,906,084
Patented Sept. 29, 1959

2,906,084

SIDE DELIVERY RAKE

Calvin P. Weaver, Tipp City, Ohio

Application June 2, 1955, Serial No. 512,607

9 Claims. (Cl. 56—377)

This invention relates to a side delivery rake. The invention relates more particularly to a push type side delivery rake. The invention relates still more particularly to a push type side delivery rake which may be easily and readily attached and detached from a tractor or other propelling means.

This invention also relates to a side delivery rake, the raking means of which does not require the use of stripper bars.

A push type side delivery rake has several advantages over the type of rake which is pulled behind propelling means. The push type of rake enables the operator to closely observe the operation of the rake while the operator is also operating the propelling means. Furthermore, with the use of a push type of rake, none of the raked material is crushed or bruised by the propelling means. The push type of rake also permits the pulling of other types of machinery behind the propelling means while the raking operation is being performed.

However, it has been found that in the use of the conventional push type side delivery rake it is necessary to firmly and rigidly secure the rake to the tractor which propels it. It is difficult to attach or to remove the conventional push type of rake from a tractor. In the past, attachment or detachment of a push type rake to or from a tractor has required hours of work. Furthermore, many kinds of push type side delivery rakes are only adapted to be used with a particular design of tractor.

Hence, an object of this invention is to provide a "free floating" side delivery rake of the push type which is easily and quickly attachable to a tractor or detachable therefrom, the rake being guided and propelled by the tractor and not rigidly attached thereto.

Previously, all side delivery hay rakes have been provided with stripper bars. In raking with conventional side delivery rakes, the raked hay, in the formation of a windrow at the forward portion of the rake, builds up over the raking bars and therefore stripping bars are needed to remove the hay from the raking bars. This stripping action causes a large amount of threshing and crumbling of the leaves and stems of the hay and is therefore very objectionable.

Hence, another object of this invention is to provide a side delivery hay rake which does not have stripping bars and hence has no stripping action.

Another object of this invention is to provide a push type of rake which is easily attachable to any conventional farm tractor or to other types of propelling means.

Another object of this invention is to provide a side delivery hay rake, the raking means of which may be operated by the propelling means, or which rake may be provided with a motor or engine attacher thereto for operation of the raking means, the power for operation of the motor or engine being supplied by the propelling means, or the power for operation being self-contained in the engine or motor.

Another object of this invention is to provide a push type side delivery hay rake which may be easily and quickly attached to the rear portion of an automobile or the like so that the rake may be trailed therebehind.

Another object of this invention is to provide means by which a push type side delivery rake may be adjustably attached to a tractor so that the rake may be employed in various types of raking operations.

Another object of this invention is to provide a side delivery rake which is so easily detached, attached, and manipulated that such procedure can be quickly and easily performed by one person.

Another object of this invention is to provide a side delivery rake which may be either pushed in advance of a propelling means for raking operation or which may be pulled behind a propelling means for operation as a tedder.

Other objects and advantages reside in the construction of parts, the combination thereof and the mode of operation, as will become more apparent from the following description.

In the drawings:

Figure 1 is a perspective view showing a hay rake of this invention attached to a tricycle type of tractor and disposed at the forward end thereof.

Figure 2 is a top plan view of smaller dimension than that of Figure 1 showing the assembly of Figure 1 in the process of raking hay.

Figure 3 is a top plan view of a hay rake of this invention attached to a "standard tread" or four-wheel type of tractor in which the front and rear wheels of the tractor are aligned. This view shows a preferred modification of the operating means for operation of the raking means.

Figure 4 is an elevational view showing the raking means of this invention including raking bars and raking teeth attached thereto.

Figure 5 is an enlarged elevational view, with parts broken away and shown in section, of a rake bar and tooth mounted thereon.

Figure 6 is an enlarged fragmentary perspective view, with parts broken away, showing a flexible attachment means for connection of a hay rake of this invention to a tractor.

Figure 7 is an enlarged perspective view, with parts broken away, showing another modification of the operating means for the raking means of this invention.

Figure 8 is a top plan view, of smaller scale, showing a hay rake of this invention being drawn and operated as a tedder behind a tractor.

Referring to the drawings in detail, a hay rake 10 of this invention comprises a support structure having a plurality of frame members, there being a frame member 12 and a frame member 14 angularly attached one to the other at the ends thereof, as shown in Figures 1 and 2. The frame member 14 is provided with an arcuate end portion 16.

The raking means of this invention is carried by the frame members 12 and 14. Rotatably attached to the arcuate end portion 16 of the frame member 14 is a wheel or spider 17 provided with a plurality of radial arms 18. At the end of each of the arms 18 is a rotatable pin 20.

Rotatably attached to the support structure adjacent the juncture of the frame members 12 and 14 is a spider or wheel 23, similar to the wheel 17, and having a plurality of radial arms 24. At the end of each of the arms 24 is a rotatable pin 26. A plurality of raking bars 27 are carried by the rotatable pins 20 and 26 of the wheels 17 and 23, respectively, there being one raking bar 27 supported by each pair of pins 20 and 26 for movement by the wheels or spiders 17 and 23.

A plurality of vertically extending raking teeth 28 are attached to each of the raking bars 27. The raking teeth 28 are somewhat rigid but have flexibility and resiliency. Each of the raking teeth 28 is slidably inserted through a pair of diametrically opposite apertures in the raking bar 27. Each of the raking teeth 28 is provided with a head 29 at the upper end thereof which prevents complete passage of the tooth 28 through the apertures through which the tooth extends. Lying horizontally along the upper surface of each raking bar 27, attached thereto by any suitable detachable means, and covering the heads 29, is an angular channel 30, as shown in Figure 5. The channel 30 prevents movement of the teeth 28 from the raking bar 27. The spiders or wheels 17 and 23 are supported by the frame members 12 and 14 at a considerable height from the ground. Therefore, the raking bars 27 are a considerable height from the ground. The raking teeth 28 are, preferably, in the order of twenty-two to thirty-four inches in length and, thus, have sufficient length to reach the ground during rotation of the spiders or wheels 17 and 23.

A guide bar or push bar 31 shown in Figure 1 is attached to the frame member 14 intermediate the ends thereof and is attached to the frame member 12 normal thereto and at the front end thereof. The guide bar 31 is adapted to be positioned at the side of a tricycle type of tractor 32 shown in Figure 1. At the rear end of the guide bar 31 is attached a plate or angle bar 33 normal thereto. The angle bar 33 is provided wtih a plurality of apertures in vertical alignment. A connector plate 34 is attached to a rear axle housing 35 of the tractor 32, and a clevis assembly, preferably of the type described in my copending patent application 402,065, now Patent 2,847,814, may be used for attachment of the angle bar 33 to the connector plate 34. The angle bar 33 thus serves as an abutment member engaging the plate 34.

Intermediate the ends of the guide bar 31 are means for flexible attachment of the guide bar to a side member or tool bar 36 of the tractor 32. The side member 36 may be provided with a plurality of apertures 38, as shown in Figures 1 and 6. A U-shaped channel 40 is attached to the push bar 31, transversely thereto, by means of an adjustable clamp 42, provided with an adjustment handle 44. The U-shaped channel 40 is provided with a plurality of apertures 45. The clamp 42 permits the channel 40 to be adjustably moved along the length of the push bar 31; the clamp 42 also may be adjustably moved to other apertures 45 for adjustment of the height of the channel 40 upon the guide bar 31.

The U-shaped channel 40 is provided with an elongate vertically extending slot 46. A suitable flexible member, such as a chain 48, may be looped through one of the apertures 38 of the side member 36 of the tractor 32, as clearly shown in Figure 6. Links of the chain 48 are slidably inserted into the vertical slot 46 of the U-shaped channel 40, as shown in Figure 6. The vertically extending U-shaped channel 40 is of sufficient length to permit the upper end thereof to remain above the lower edge of the side member 36, regardless of the pivotal movement of the push bar 31, as the push bar 31 pivotally moves about its pivotal axis. The pivotal axis is established by the pivotal attachment of the push bar 31 to the rear axle housing 35 of the tractor 32. Attachment of the push bar 31 to the tractor 32 by means of the channel 40 with the chain 48, permits both horizontal and vertical pivotal movement of the push bar 31.

A caster wheel 50 is pivotally attached to the push bar 31 adjacent the forward end thereof by means of a stem 51, carried within a bracket 52. A jack screw 53 provides means for adjustment of the height of the forward portion of the push bar 31. A caster wheel 54 is pivotally attached to the frame member 14 intermediate the ends thereof and is vertically adjustable thereon by means of a jack screw 56.

In Figure 1 the means for operation of the raking means is shown as being a belt drive from a belt wheel 60 of the tractor 32. An endless belt 61 engages the belt wheel 60 and drives a belt pulley wheel 62. The belt 61 moves between belt guide rollers 66 and moves over a belt tightening device 68 comprising a pivotally mounted arm 70, carrying a roller 72 and having a spring 74 attached at the end thereof.

The belt pulley wheel 62 is attached to a shaft 78 which is rotatably carried by bearing support members 80. The shaft 78 is attached to a gear mechanism having a housing 82. The output shaft of the gear mechanism supports the spider 23 to which the raking bars 27 are attached. Thus, the belt wheel 60 drives the belt 61 which rotates the belt pulley wheel 62 and the shaft 78. The shaft 78, through the gear mechanism of the gear housing 82, drives the raking bars 27.

Rotation of the spiders 23 and 17, as discussed above, causes movement of the raking bars 27 with the raking teeth 28. As windrows are formed by the raking means, as shown in Figure 2, the hay does not accumulate higher than the raking bars. This is due to the fact that raking bars 27 are a considerable distance from the ground, even in the lowermost position thereof. The length and rigidity of the raking teeth 28 makes possible excellent raking action without the necessity of stripping bars.

Therefore, it is understood that the side delivery rake of this invention may be readily pushed in advance of a propelling means, such as the tractor 32. The caster wheels 50 and 54 support the raking means while the rake is pushed and guided by the push bar 31. The push bar or guide bar 31 is attached to the tractor 32 only at two locations; namely, the pivotal attachment of the end of the push bar 31 to the rear axle housing 35 and the flexible attachment of the guide bar 31 by means of the channel 40 and the chain 48 to the side of the tractor 32. Neither of these connections of the push bar 31 to the tractor 32 is a rigid connection. The caster wheels 50 and 54, supporting the raking means, permit the raking means to assume its own elevation substantially independent of the elevation of the tractor. This is due to the fact that the caster wheels may assume a given elevation either higher or lower than that of the tractor, depending upon the irregularities of the terrain over which the rake is pushed and guided by the tractor.

The side delivery rake of this invention may be quickly and easily attached and detached from a tractor or other propelling means due to the fact that the push bar or guide bar is attached to the tractor only at two locations.

An auxiliary support leg 90 provided with a base 92 is adjustably attached to the arcuate end portion 16 of the frame member 14, as clearly shown in Figure 1. The auxiliary support leg 90 is used to aid in supporting the raking means during attachment and detachment of the rake to a propelling means. The auxiliary support leg 90 with the caster wheels 50 and 54 provides three-point support of the raking means so that the guide bar or push bar 31 may remain substantially horizontal during attachment of the guide bar 31 to a tractor and during detachment therefrom.

The side delivery rake of this invention may also be attached to the rearward portion of an automobile or the like for transfer thereof, as shown and discussed in the aforesaid patent application. When the side delivery rake is pulled behind an automobile or the like, during rapid transfer thereof, the caster wheel 50 is prevented from pivotal action, and a set screw 95, threadedly attached to the bracket 52, is manually adjustable to serve to retain the stem 51 against pivotal action thereof.

Figure 3 shows attachment of the side delivery rake of this invention to a standard tread or four-wheel type of tractor 98. The tractor 98 is provided with a front axle 100.

A short push bar 102 is used to pivotally attach the side delivery rake to the axle 100. The attachment of the end of the push bar 102 to the axle 100 is preferably by means of a bracket and clevis assembly 103, as discussed with respect to the connector plate 34 and the plate 33 shown in Figure 1, and which is shown and discussed in the aforementioned patent application. The assembly shown in Figure 3 is also provided with an auxiliary push bar or guide bar 104, one end of which is attached to a frame member 112 intermediate the ends thereof. Frame member 112 is similar to the frame member 12 shown in Figure 1. The other end of the auxiliary push bar or guide bar 104 has a vertical channel 113 attached thereto. The channel 113 is of the type shown by channel 40 in Figure 6 and slidably abuts the axle 100.

A flexible means, such as a chain 106, is used to loosely attach the channel 113 to the axle 100.

The raking assembly shown in Figure 3 also has a frame member 114 having an arcuate end 116. The raking means comprises rotatable spiders or wheels 118 and 124 carrying rotatable pins 125 and 126, respectively. The wheels 118 and 124 support raking bars 127. A caster wheel 128 is attached to the frame member 112 and a caster wheel 129 is attached to the push bar 102.

The assembly as shown in Figure 3 is provided with an engine or motor 130 supported by the frame member 112 and connected through a suitable gear assembly 132 for operation of the raking means. The engine or motor 130 may comprise an electric motor, a hydraulic motor, or an internal combustion engine or the like.

In Figure 7 is shown another modification of an operating means for the raking means of this invention. In Figure 7 a rotary fluid motor 136 is shown attached to a frame member 138, similar to the frame members 12 and 112, for operation of a spider 140 through a suitable gear arrangement 142. The fluid motor 136 may be operated through a conventional hydraulic system with which many tractors are now provided.

Figure 8 shows a hay rake of the modification shown in Figure 3 with the hay rake attached by means of a conventional drawbar 146 at the rear portion of the tractor 98. The hay rake assembly may be so attached at the rearward portion of a tractor for use of the hay rake as a tedder.

Thus, it is understood that the hay rake of this invention may be applied to numerous types of propelling means. The raking means may be operated by the propelling means, such as shown in Figure 1, or the raking means may be provided with a separate engine or motor, as shown and discussed with respect to Figures 3, 7 and 8.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described by invention, I claim:

1. A "free floating" push type side delivery rake for attachment to a tractor having a rear axle housing and a side member, the rake having a support structure, caster wheel means adjustably attached to the support structure, a pair of spider members rotatably carried by the support structure at opposite portions thereof, a plurality of raking bars rotatably carried by the spider members, a plurality of elongate vertically extending raking teeth attached to each of the raking bars, means attached to one of the spider members for rotation thereof, the combination comprising a push bar attached at one end thereof to the support structure and extending substantially horizontally therefrom, a plate attached to the rear axle housing of the tractor, pivotal means attaching the other end of the push bar to the plate, the push bar being pivotally movable about vertical and horizontal axes, a channel attached to the push bar intermediate the ends thereof and normal thereto, the channel having an elongate longitudinal slot in the upper end thereof, and a flexible member loosely attached to the side member of the tractor and having portions thereof disposed in the longitudinal slot of the channel, the channel being slidably engageable with the side member of the tractor.

2. A side delivery rake adapted to be pushed and guided by a motor vehicle having a pair of rear wheels provided with an axle housing therebetween, the rake being of the type having a support structure, raking means rotatably carried by the support structure, operating means attached to the raking means, caster wheel means attached to the support structure for support thereof, the combination comprising a guide bar attached to the support structure and having an end extending substantially horizontally therefrom, connector means pivotally attaching said end of the guide bar to the rear portion of a motor vehicle, an elongate abutment member attached to the guide bar normal thereto and extending therefrom, the abutment member being adapted to engage the said connector means, the abutment member being adapted to be attached to the connector means while being in engagement therewith, and flexible means in spaced relation from the abutment member attached to the motor vehicle and attached to the guide bar.

3. A side delivery rake adapted to be pushed and guided by a propelling vehicle in advance thereof, the rake having a plurality of support members, a pair of spider members rotatably carried by the support members, a plurality of raking bars carried by the support members, a plurality of elongate raking teeth attached to each of the raking bars, means attached to one of the spider members for rotating the spider members and the raking bars, the combination comprising caster wheel means adjustably attached to the support members for support thereof, a push bar attached to the support members and extending therefrom, means for pivotally attaching the push bar to the rear portion of a propelling vehicle, a channel member attached to the push bar substantially normal thereto and intermediate the ends thereof, and flexible means loosely attaching the channel member to the propelling vehicle, the channel member being slidably engageable with the propelling vehicle.

4. In a push type side delivery hay rake adapted to be propelled by a propelling vehicle and having a support structure, raking means rotatably carried by the support structure, means for operation of the raking means, caster wheel means attached to the support structure for support thereof, the combination comprising a push bar attached to the support structure and extending horizontally therefrom, pivotal means attached to the push bar for attachment thereof to the rear portion of the propelling vehicle, and flexible means attached to the push bar loosely attaching the push bar to the propelling vehicle.

5. A push type front end side delivery rake for movement by a propelling vehicle having a rear axle housing, the combination comprising a support structure, raking means carried by the support structure, a guide bar member attached to the support structure, flexible means loosely attached between the guide bar member and the forward portion of the propelling vehicle, abutment means attached to the guide bar member and engaging the rear axle housing of the propelling vehicle.

6. A push type side delivery rake having a support structure provided with support wheel means, raking means carried by the support structure for movement by a propelling vehicle having a pair of rear wheels with a rear axle housing extending therebetween, the combination comprising a guide bar member attached to the support structure, flexible means loosely attached between the guide bar member and a side portion of the propelling vehicle, and abutment means attached to the guide bar member and engaging the rear axle housing intermediate the rear wheels of the propelling vehicle.

7. A push type side delivery rake adapted to be propelled and guided by a tractor comprising a plurality of horizontally disposed support members, caster wheels attached to the support members for support thereof, rotary raking means carried by the support members, the rotary raking means including a pair of spider members rotatably carried by the support members, a plurality of horizontally disposed raking bars rotatably carried by the spider members, a plurality of elongate raking teeth attached to each of the raking bars, each of the raking teeth being in the order of twenty-two to thirty-four inches in length and vertically attached to its respective raking bar, means attached to the raking means for operation thereof, a plate attached to the axle member of the tractor, pivotal means connecting a portion of the support members to the plate, and a flexible member loosely encompassing a portion of the tractor and attached to a portion of the support members.

8. In a free floating push type farming machine guided and propelled by a tractor, a horizontal push bar having an end portion in engagement with the tractor, a vertical member intermediate the ends of the push bar, a clamp encompassing the push bar and adjustably attached to the vertical member, the vertical member having a vertical slot therein open at the upper end thereof, a flexible member loosely encompassing a portion of the tractor and adjustably secured in the slot of the vertical member so that a portion of the push bar intermediate the ends thereof is loosely attached to the tractor while an end portion of the push bar is in engagement with the tractor so that the machine is pushed and guided by the tractor, the vertical member slidably engaging a portion of the tractor.

9. In a free floating push type farming machine guided and propelled by a tractor, a horizontal push bar having an end portion in engagement with the tractor, means pivotally attaching said end portion of the push bar to the tractor, a vertical member intermediate the ends of the push bar, the vertical member having a plurality of holes therein, a clamp having portions located in any of said holes of the vertical member rigidly adjustably attaching the push bar to the vertical member, the vertical member having a vertical slot therein open at the upper end thereof, a flexible member loosely encompassing a portion of the tractor and adjustably secured in the slot of the vertical member, the push bar thus being loosely and pivotally attached to the tractor while being in engagement therewith so that the machine is pushed and guided by the tractor.

References Cited in the file of this patent

UNITED STATES PATENTS

| | | |
|---|---|---|
| 1,620,454 | Farren | Mar. 8, 1927 |
| 2,436,475 | Jones et al. | Feb. 24, 1948 |
| 2,573,971 | Hoefer | Nov. 6, 1951 |
| 2,621,466 | Kopp | Dec. 16, 1952 |
| 2,713,241 | West | July 19, 1955 |
| 2,719,401 | Erickson et al. | Oct. 4, 1955 |

FOREIGN PATENTS

| | | |
|---|---|---|
| 10,103 | Great Britain | May 2, 1903 |
| 158,523 | Australia | Aug. 27, 1954 |